United States Patent
Backman

(10) Patent No.: US 6,697,813 B1
(45) Date of Patent: Feb. 24, 2004

(54) DATA STRUCTURES AND METHODS FOR IMAGING COMPUTER READABLE MEDIA

(75) Inventor: Drake A. Backman, Orem, UT (US)

(73) Assignee: Novell, Inc., Provo, UT (US)

( * ) Notice: Subject to any disclaimer, the term of this patent is extended or adjusted under 35 U.S.C. 154(b) by 161 days.

(21) Appl. No.: 09/891,695

(22) Filed: Jun. 26, 2001

Related U.S. Application Data

(63) Continuation of application No. 09/818,810, filed on Mar. 27, 2001, now abandoned.

(51) Int. Cl.[7] .................................................. G06F 17/30
(52) U.S. Cl. ...................................... 707/101; 707/102
(58) Field of Search ................................ 707/200, 201, 707/202, 203, 102, 204, 101; 711/714, 154, 162

(56) References Cited

U.S. PATENT DOCUMENTS

| | | | |
|---|---|---|---|
| 5,359,725 A | * 10/1994 | Garcia et al. | 707/200 |
| 5,953,744 A | 9/1999 | Marasco | 711/162 |
| 6,023,713 A | * 2/2000 | Grimsrud et al. | 707/205 |
| 6,173,377 B1 | 1/2001 | Yanai et al. | 711/162 |
| 6,199,146 B1 | 3/2001 | Pence | 711/154 |
| 6,397,293 B2 | * 5/2002 | Shrader et al. | 711/114 |

FOREIGN PATENT DOCUMENTS

EP 1096496 A2 * 5/2001 ......... G11B/27/034

* cited by examiner

*Primary Examiner*—Diane D. Mizrahi
(74) *Attorney, Agent, or Firm*—Dinsmore & Shohl LLP

(57) ABSTRACT

Data structures and methods for imaging computer readable media are provided. A data structure used to recreate computer readable media is provided having a type identifier used to identify a type of image data originally imaged. Further, a length data identifies the size of a data stream which is a portion of a file associated with the image data, wherein the data stream combined with additional data streams are operable to form a complete file. Moreover, a method of collecting image data is provided wherein control data is associated with a file residing in the image data, the control data includes a partition type, compression type, file length, and one or more file set types. Furthermore, the control data are organized on a computer readable medium, along with the file. Also, a method of customizing the creation of an image on a computer readable medium is provided wherein zero or more exclude files in an image source are identified and are not included in a created image target. The created image target includes one or more files which are identified as files to retain from the image source.

19 Claims, 3 Drawing Sheets

DATA STRUCTURES AND METHODS FOR IMAGING COMPUTER READABLE MEDIA

This application is a continuation and claims priority from pending U.S. application Ser. No. 09/818,810 filed on Mar. 27, 2001, now abandoned, the disclosure of which is incorporated herein by reference.

FIELD OF THE INVENTION

The present invention relates to data structures and methods for imaging computer readable media.

BACKGROUND OF THE INVENTION

Providing backup data to a hard drive of a computing device is of vital importance in today's information age. Individuals have become so dependent upon using their computing device, that they have become non functional when the device is inoperable. When a computing device starts up, or is booted up, it uses a hard drive memory associated with the computing device to provide all the necessary data files and data application programs to the user of the device. Some of these files may reside locally on the computing device, while others are provided remotely to the computing device if the computing device is networked with other devices providing files and applications.

A standard process, referred to as imaging a hard drive, takes a snapshot of a hard drive often referred to as a source image associated with an originating computing device. This allows the source image data to be stored off onto additional computer readable media, such as and by way of example only, CDs, diskettes, additional hard drives, and other magnetic or optical storage devices.

During the imaging process an end user, or software application initiating the imaging process, has little to no control over how the imaged data coming from an image source (e.g., hard drive of a computing device which is being backed up) will be structured or organized in the imaged data (e.g. external media housing the image source in format which may be used to restore the image source as needed to an image target).

An imaging process typically writes, in a binary format (e.g. image data), the image source onto a computer readable medium. This write process is usually performed serially, since attempting to store the data in random access memory ("RAM") and then further attempting to provide some intelligent structure to the data, is not a practical option given the size of the image source, which could exceed several gigabytes, or terabytes of data (especially for network or remote imaging of client computing devices). Even if the imaged data are compressed, before being housed in RAM, the size of the compressed data still makes it infeasible to attempt. Moreover, trying to write to external media as an intermediate step and then running a process to structure the imaged data, creates an impractical process and time consuming operation.

However, some minimal structure is often provided to ensure that partition information, or basic file attribute information (e.g., creation date, modified date, and the like) is captured, to ensure that the image data created from an image source is adequately reproducible onto some future image target.

Yet, because only minimal structure or control is given to the end user or the application initiating an image process, the ability to control or limit what is imaged is minimal. Moreover, it may be extremely desirable to append files from an image source into existing imaged data, without having to perform an entire image process from start. Imaging can be a time and process intensive operation, which many users are reluctant to perform, and correspondingly users may rely on automated processes initiated in the early morning hours, when the users are not likely to be using their computing devices which are being imaged.

Likewise, networked computing devices or servers which are imaged, are often imaged in the early morning hours or at scheduled times in which the individual end users are notified of scheduled down times when the imaging processes will take place. Further, some imaging processes may not permit other applications to run while the imaging is taking place, this is because a file which is being imaged could be modified/altered, which may affect the overall integrity of the imaging operation.

Accordingly, the imaging process should be controllable and customizable by the end user to alleviate usability/performance concerns as discussed above. To do this, the imaging process needs to be controlled at a data file level, rather, than what is presently done in the industry where control is performed at a partition level or the computer readable medium being imaged.

Moreover, end users should have the ability to view what is imaged and selectively restore items as needed, or exclude items altogether from an image. This would permit users to more intelligently control the back up and restoration of their data. Further, network administrators could use a single image to restore multiple image targets by selectively restoring, on one or more computing devices, only certain aspects of the image data based on file sets associated with individual computing devices.

Although some control may be provided in the creation of the imaged data, a better data format of the imaged data is needed to permit reproduction of the imaged data on target computing devices, even if some of these target computing devices utilize a file system different from the computing device which was the source of the imaged data.

Further, a better format of the imaged data would permit more user control and even modify the imaged data by excluding or including selected files included within the imaged data without compromising the integrity of the original imaged data. Additionally, the imaged data may be more effectively compressed with a better format and provides greater flexible and control for future uses which may be desired by an end user.

SUMMARY OF THE INVENTION

Accordingly, an object of the invention is to provide data structures and methods for imaging computer readable media. During the imaging process of a computer readable medium associated with a computing device, the data being captured from the source computer readable medium are structured such that information regarding one or more files residing on the source computer readable medium is easily customizable and restored to a target computer readable medium optimally and as needed. A type identifier identifies the type of data associated with a file in the source computer readable medium and a length data identifies the length of a data stream associated with a least a portion of the file. One or more data streams combine to form a single complete file.

Further, a file header includes an index to a partition type and includes one or more type identifiers along with one or more set types. A set type associates the file with logical groups, such as and by way of example only, files to include during an image process, files to exclude during an image process, files associated with work groups (e.g., system administrators, secretaries, developers, managers, and the like), files associated with certain data format, and others.

Once a source computer medium is imaged such that the above attributes are recorded, a single image may provide multiple customized image targets to one or more additional computing devices. Moreover, since the imaging is performed at a file level, rather, than the typical partition level, an interface (e.g., browser, customized windowing application, and the like) provides a user the ability to control the imaging process eliminating unwanted files in the image target. As one skilled in the art will readily appreciate this provides tremendous benefit to the user or network administrators performing the imaging.

Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims. To achieve the foregoing and other objects and in accordance with the purpose of the present invention, data structures and methods for imaging computer readable media are provided.

A data structure used to recreate computer readable media is provided having a type identifier used to identify a type of image data originally imaged. Further a length data is used to identify the size of a data stream which is at least a portion of a file located in the imaged data. Zero or more data streams are operable to be assembled to form t he complete file.

In another aspect of the present invention, a method of collecting image data having executable instructions is provided wherein control data is received and associated with a file included in image data. The control data further includes a partition type, compression type, file length, and one or more file set types. Moreover, the control data is organized on a computer readable medium together with the file.

In yet another aspect of the present invention, a method of customizing the creation of an image on a computer readable medium is provided having executable instructions, wherein zero or more files in an image source are identified as exclude files and therefore not included in a created image target. Furthermore, one or more files in an image source are identified as files to include in the created image target.

Still other aspects of the present invention will become apparent to those skilled in the art from the following description of an exemplary embodiment, which is by way of illustration, one of the exemplary modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

DETAILED DESCRIPTION

Figure 1:
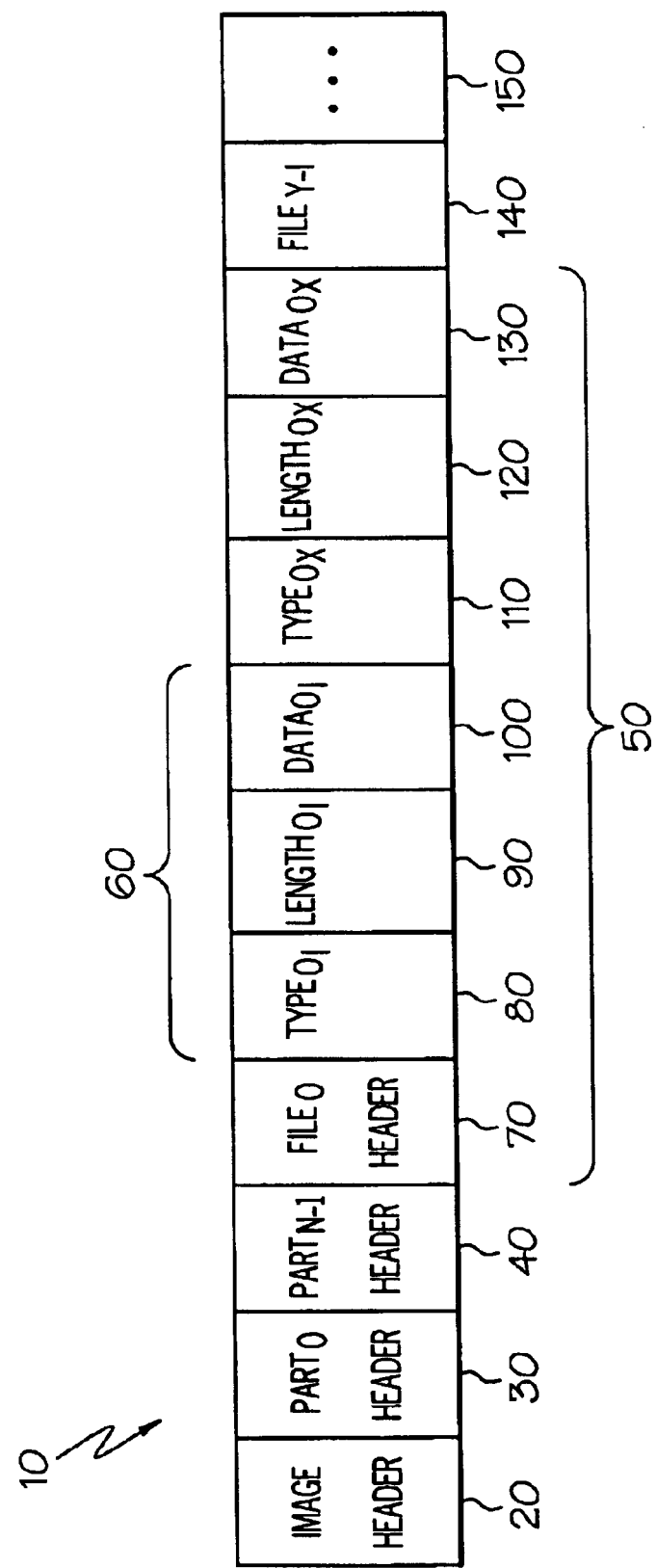
FIG. 1 depicts various data structures of the present invention.

The present invention provides data structures and methods for imaging computer readable media. One embodiment of the present invention is implemented in NOVELL's ZENworks for Desktops product using the C or C++ programming language. Of course other operating systems, and programming languages (now known or hereafter developed) may also be readily employed.

The image of hard drive data may be stored on a network disk drive, or on an external media such as a CD, diskette, tapes, ZIP magnetic drives, and the like. Although as one skilled in the art will appreciate, the image may be stored on any computer readable media such as optical, magnetic, and the like. Moreover, the image need not reside on a single computer readable medium, rather, several computer readable media may include the data having a single image of a hard drive.

Furthermore, a computing device is any device capable or processing executable instructions, such as and by way of example only, personal computers, super computers, mainframe computers, mid-range workstation computers, GPS systems, car computing devices, hand held devices (e.g., Personal Digital Assistants), computing peripheral devices (e.g., MP3 players, printers, scanners, faxes, copiers, CD-RW, ZIP drives, electronic books, electronic gaming devices, and others), mobile telecommunication devices (e.g., wireless phones), intelligent appliances, intelligent apparel (e.g., watches), and the like.

A typical imaging process will serially read the source image data, which may include by way of example only a hard drive of a single computing device, a series of hard drives resident on multiple computing devices, external removable computer readable media (e.g., magnetic or optical), remote storage devices, and the like. As these data are read from the source image data, they are written as imaged data, typically in a binary format. The imaged data reside on computer readable media (e.g. magnetic, optical, and others). Again, the location of the imaged data may reside on a mirrored drive associated with the hard drive a computing device, external/removable computer readable media, remote computer readable media and the like.

As the imaging process proceeds, information for each partition of the image source data is collected. Partitions are areas on the computer readable media having the data, each partition may include a certain number of files or size of data, and other information which is readily apparent to those skilled in the art. The partition information assist in locating data logically assigned within a certain location on the image source data. Partition information permits file systems such as NetWare, NTFS, EXT2, FAT, BeOs, and others to operate as designed. As one skilled in the art will readily appreciate, the partition information will be structured according to the individual file systems supported or being used by a computing device's computer readable media.

Imaged data will also include an image header which will identify the number of partitions included within the image source data. An image header combined with partition information (e.g., partition headers) assist an image restore process, in creating a replica of the image source data when requested to do so. Yet as presented above, since there is no control in the typical image process beyond the partitioning level, customization of imaged data and the migration of image source data from an original partition structure to a different partition structure once restored are not readily achievable.

To remedy these and other short comings in the industry, the image process is modified such that as the imaged data include file headers which are indexed to a particular partition header. In this way, a single file originating from an image source maybe appended to a imaged data already existing and be associated with the correct partition in the image source. In other words, file data residing in the image source data does not have to be sequentially stored in the imaged data. This provides obvious benefits, to a customized imaging process by allowing new files to be readily added to the imaged data with little to no user interruption and not need to initiate an entire re-image process.

Moreover, file header information includes a number of additional attributes which are of particular use to an improved imaging process. For example, file headers may include set type information. This set type information may provide information about what workgroup a user belongs to, whether the file has been identified by a user or an automated process as a file to be excluded or included in the imaged data, and others.

The include and exclude file type information may be based on workgroups, such that a file is included with one workgroup but not included with another workgroup. As one skilled in the art will readily appreciate this permits a single imaged data source to support the creation of multiple image target sources on multiple computer readable media servicing multiple computing devices, based on file set types. This provides tremendous customization capabilities for network administrators or individual end users by using the imaged source of the present invention during a restore process.

Moreover, data associated with a file may be further broken into parts following a file header within the imaged data, such that the sum of the individual parts form a single complete file. The parts may each include a header which identifies its data type, a data type by way of example only, may include data links, directory names, raw data, compressed data, uncompressed data, and others. Moreover, a flag may be used within the part header to indicate the type of data compression on the data which follows. Although, as one skilled in the art will readily appreciate, compression need not occur at all.

Further, the part header will indicate the length of the data that follows the part header, the length may include both the uncompressed length of the data that follows and/or the length of the compressed data which follows. After the length data, the data will follow. In this way the structure of the imaged source may appear as depicted in FIG. 1.

FIG. 1 depicts various data structures of the present invention. An entire imaged data 10 includes a beginning image header 20, one or more partition headers 30 and 40, one or more file headers 70 and 140, one or more data type headers 80 and 110, one or more length data 90 and 120, and one or more data parts 100 and 130.

An image header 20 may include information regarding the number of partitions. Following the image header 20 are one or more partition headers $Part_0$ 30 and $Part_{n-1}$ 40. Each partition header includes partition information describing the types of partition included in the original image source data. It may also include, by way of example only, the original cluster size, the total number of sectors in the original partition, the number of used sectors in the originating partition, original and minimum size of the original source partition, and the like.

Optimally, as the imaging process proceeds partition headers, as identified in the image source data, are indexed and retained in RAM in a data structure controlled by a set of executable instructions, such as by way of example only, an array where the array location is the index value, and each element of the array is a data structure having the partition header information, as described above.

Next, following the partition headers are one or more file headers, such as a first encountered file header $File_0$ 70 continuing until a last file header $File_{y-1}$ 140 is encountered. File headers are associated with data in the image source, different types of data may be defined, such as and by way of example only, data links, compressed data, uncompressed data, directory names, and the like. A file header includes a partition index such that it may be associated with a particular partition header. This permits file headers and file data to be appended to imaged data without having to recreate an new imaged data each time a file is added on an image source.

As discussed above, file headers also include set type information. This permits files to have attribute information beyond what is normally retained within imaged data. A single file may include one to many set types, such that the file may be easily identified as a file to include in an image target for a specified workgroup (e.g., system administrator, manager, developer, secretary, and the like), or alternatively the same file may have set types which identify it as a file not to include in an image target for a different workgroup. As one skilled in the art will appreciate, this permits a single image data source to be used to restore multiple variant versions of image target sources on demand.

Following the file headers, a first type header $Type_{0I}$ 80 identifies the type of data associated with the file being imaged from the image source. Data types may be any of those enumerated above, as well as others. A file header may be followed by a single type header or multiple file headers, until and ending type header $Type_{0x}$ 110 is encountered. Next, $length_0$ data 90 follows $Type_{0I}$ 80 and ending $length_{ox}$ data 120 follows ending $Type_{0x}$ 110. As discussed above the length data may include the length of the compressed data which follows it and/or the length of the data that follows it in an uncompressed form.

Optionally, a compression indicator may be used to identify the type of compression data associated with a file is in, in this way an appropriate decompression algorithm may be used to properly restore the imaged data when needed. As one skilled in the art will appreciate length data are useful in validating image target data and in parsing the imaged data during restore operations to an image target data.

Following the length data are one or more file data, these units of data when assembled form a complete file data associated with a file header. For example, $data_{0I}$ 100 follows $length_{oI}$ 90, and an ending data unit $data_{0x}$ 130 follows an ending length data $length_{0x}$ 120. Breaking the file data up as depicted with 60 into units permits, more granular control over the file and its storage within the imaged source. For example the imaged source may be optimally compressed in a variety of compressed form, such as zip, or any ad hoc developed compression technique.

Moreover, information regarding a single file is depicted as unit 50 in FIG. 1, and this permits granular control at the file level within the imaged data. As previously presented, this allows single files to be appended onto the end of the imaged data without the need to re-image the entire image source data, since the file may be readily associated with a particular partition from the image source data.

Further, as will be apparent to one skilled in the art by 150 of FIG. 1, file units 50 may be repeated as many times as needed, until an end of file is encountered within the image source data. Additionally, with the partition information retained conversion or translation utilities may be deployed wherein a single image source stored as imaged data 10 may be populated on a restore operation to one or more image targets each target having a different partition.

For example, an image source associated with a NetWare file system and corresponding partition information may be stored utilizing the data structures depicted in FIG. 1 to form imaged data 10. The imaged data 10 may then be used to restore on a computer readable medium using the NTFS file system and having different file partition information by using a translation algorithm. As one skilled in the art will readily appreciate, this provides tremendous benefits by allowing imaged data to be partitioned on multiple file systems.

Moreover, the entire imaged data 10 may be stored in traditional binary format or in extensible markup language (XML), unicode international format, universal disk format (UDF), and others. By storing image data in a universal format it may be readily interfaced with standard browsers or other windowing interfaces permitting network administrators or users to modify file types, view the image source and further control and customize, browse, view, and store the image data. This provides tremendous control for the end user and tremendous flexibility in uniquely restoring the imaged data to one or more imaged targets.

Figure 2:
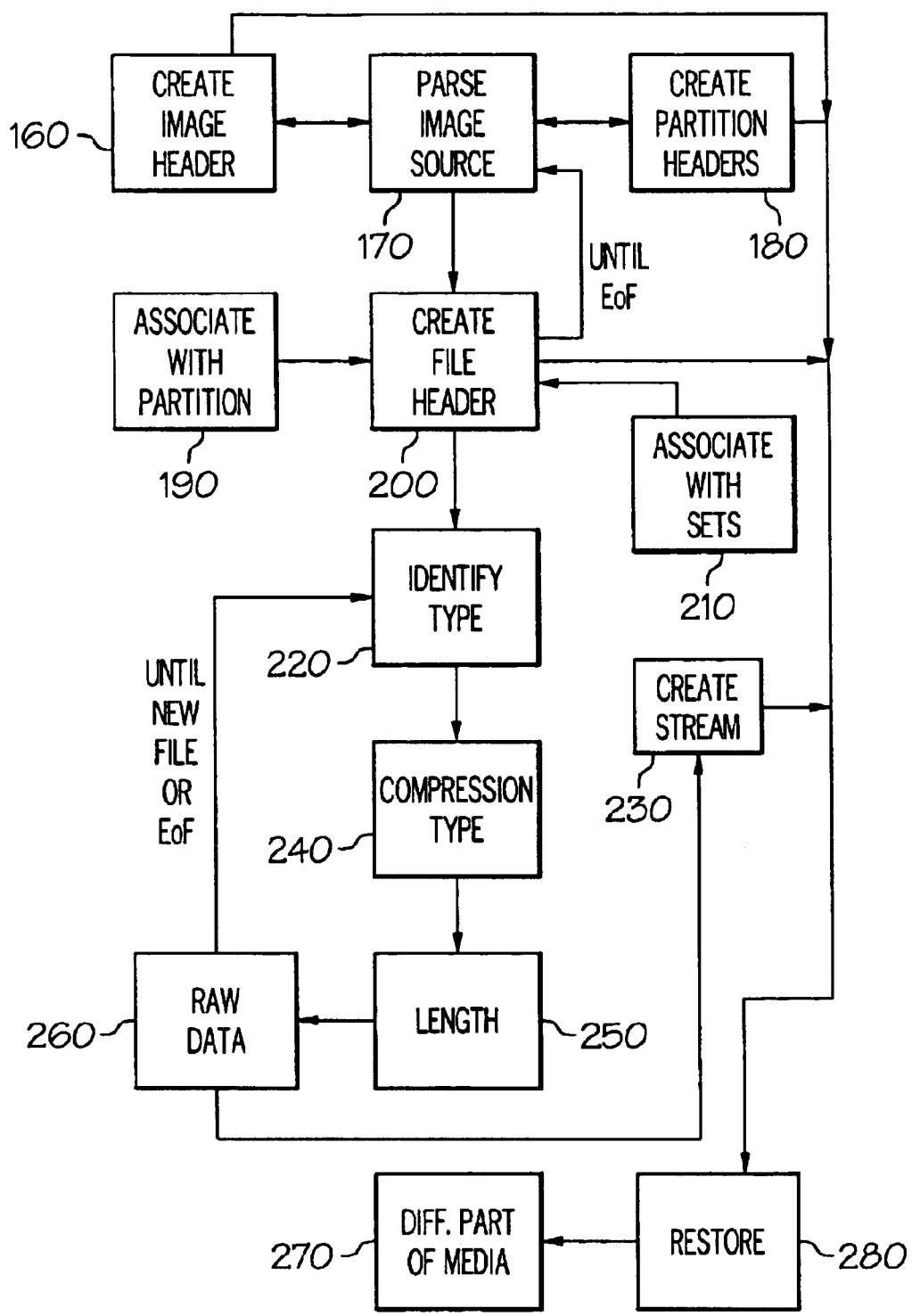
FIG. 2 depicts one method of collecting image data.

FIG. 2 depicts one method of collecting image data. Initially in step 170, the image source data is parsed with an image header created in step 160 and one or more partition headers created in step 180. Next, as files are encountered in the image source, file headers are created in step 200. When a file header is created it is associated with a partition header in step 190. As previously presented, partition headers are uniquely indexed and this information is readily available to associate and store within the created file headers.

Creating file headers continues until and an end of file ("EOF") is detected in the image source, although in the present invention files may be individually appended onto the created image data since file headers may be uniquely associated with partition headers using the partition index value. For each encountered file, the file data type is identified in step 220 and if present a compression type is identified in step 240.

Also, as previously discussed, file headers are associated with one or more file sets, which permit files to be included, excluded, and belong to user defined workgroups. The set information may also permit permissions to control who may or may not perform a restore operation on the file, as well as other restrictions or customizations.

Next a length data is created in step 250 and it is derived from the raw file data chunk in step 260. As previously presented the file data may include one or more data chunks, and the process of steps 220 through 260 continues to iterate until a new file is detected or an EOF is detected. Once a file header and the series of type, length, and data chunk information is collected for the entire image source a data stream is created in step 230.

The image header created in step 160 and the partition headers created in step 180, combine with the data stream created in step 230 to form an imaged data which may then be used by a set of executable instructions to perform a restore operation in step 280 wherein the restore operation may populate one or more image target sources. The image target sources may have different partition information (e.g., file systems, and the like) from the image source. And, the image target sources may be exist on different media from the original image source (e.g., hard drives, magnetic computer readable media, optical computer readable media, one or more logically associated computer readable media, remote computer readable media, and the like).

Figure 3:
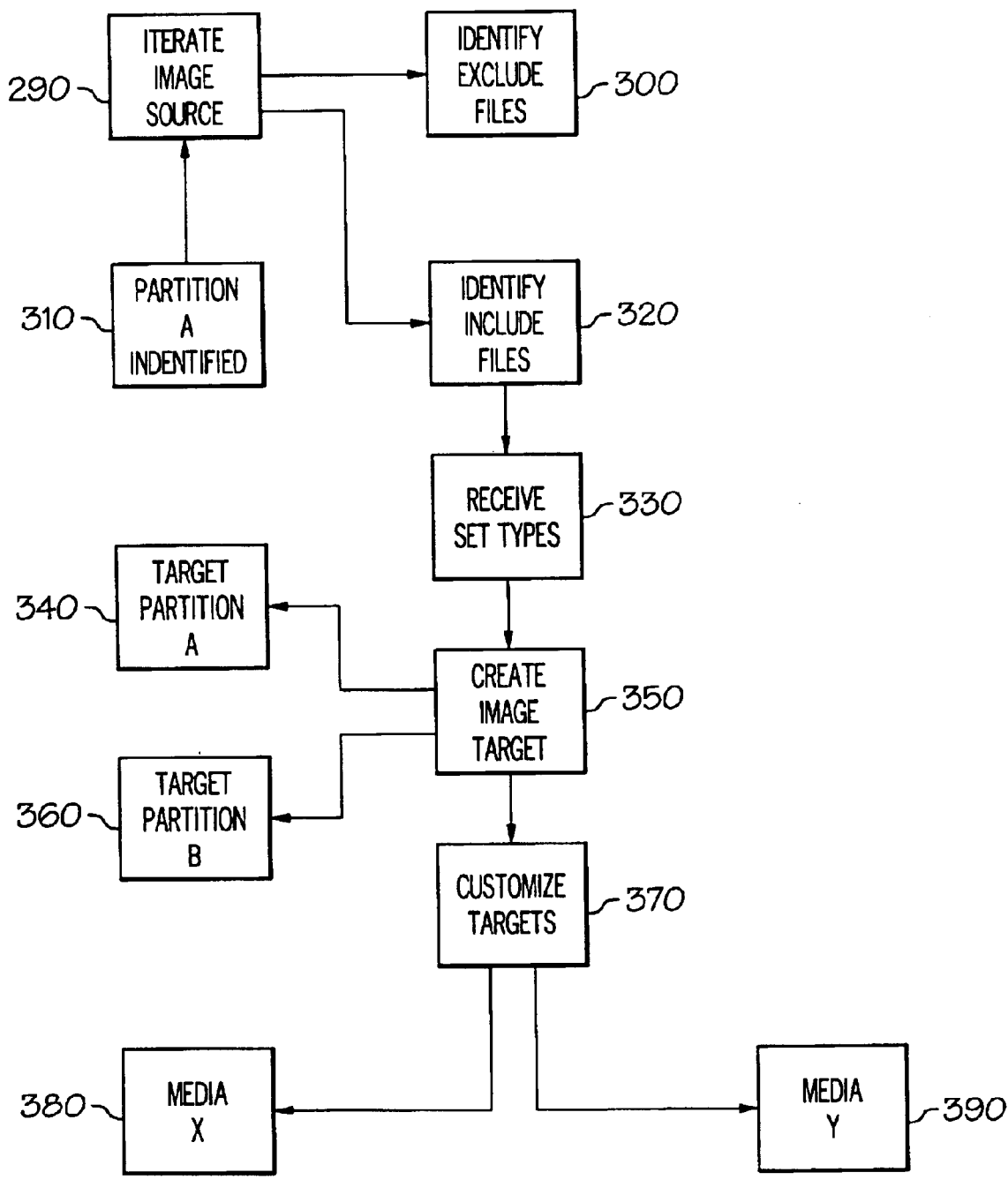
FIG. 3 depicts one method of customizing the creation of image data.

FIG. 3 depicts one method of customizing the creation of image data. Initially, an image source is iterated in step 290, and as it is iterated files are identified in step 300 as exclude files while in step 320 files may be identified as include files.

Identification may be automatic or manual selection by a user, utilizing a browser or any other interface device to identify during the image process that files belong to different types of sets. Moreover, as presented above a single file may have multiple set information, such that a single file may be excluded for some users upon a restore operation of the imaged data to an image target but include for other users.

Moreover, the type of partition, such as a Partition A, is identified and associated with the image source in step 310. This information will be retained and permits translation/conversion utilities to be developed where the imaged data created from an image source may be translated to a different partition type.

Set type information is collected in step 330, and a single image target or multiple image targets may be created in step 350 using a restore operation on the imaged data collected from iterating the image source in step 290. Further, an image target may have the same partition as the original image source as depicted in step 340, or alternatively an image target may have a partition different from the original image source as depicted in step 360.

Furthermore, customized image target sources may be derived from the imaged data in step 370, and stored on different computer readable media as depicted in steps 380 and 390.

As one skilled in the art will readily appreciate, the present invention permits tremendous benefits over existing imaging processes and restoration processes associated with backing up data stored on computer readable media. It also permits the user to have greater control and flexibility over the process and the eventual restoration. Other benefits will also be readily apparent to those skilled in the art.

The foregoing description of an exemplary embodiment of the invention has been presented for purposes of illustration and description. It is not intended to be exhaustive nor to limit the invention to the precise form disclosed. Many alternatives, modifications, and variations will be apparent to those skilled in the art in light of the above teaching. Accordingly, this invention is intended to embrace all alternatives, modifications, and variations that fall within the spirit and broad scope of the attached claims.

What is claimed:

1. A computer readable media encoded with a data structure used to recreate computer readable media, comprising:

a type identifier used to identify a type of image data originally imaged; and a length data used to identify the size of a data stream which is at least a portion of a file which is associated with the image data, wherein zero or more additional data streams are operable to be assembled to form the complete file.

2. The data structure of claim 1, further comprising:

an image header identifying a number of partitions on the image data.

3. The data structure of claim 2, further comprising:

one or more partition headers each identified by a unique index number.

4. The data structure of claim 3, further comprising:

a file header having a specific unique index number identifying a specific partition header; and one or more file set identifiers identifying one or more file associations.

5. The data structure of claim 1, wherein the data structure is stored in a binary format.

6. The data structure of claim 5, wherein the data structure is stored as extensible markup language, unicode international format, or universal disk format.

7. The data structure of claim 1, wherein the type identifier is associated with a data link, compressed data, or uncompressed data.

8. The data structure of claim 1, wherein the data stream originated from at least one of the following environments NetWare, NTFS, EXT2, FAT, and BeOs.

9. A method of collecting image data utilizing executable instructions stored on a computer readable medium, the method comprising:

receiving control data associated with a file wherein the file is included in image data, and the control data includes a partition type, compression type, file length, and one or more file set types; and organizing the control data on a computer readable medium, along with the file.

10. The method of claim 9, wherein the control data and the file are received from a hard drive of a computing device.

11. The method of claim 9, further comprising:

restoring the file to a second computer readable medium using the control data.

12. The method of claim 11, wherein the second computer readable medium has a second partition type different from the partition type.

13. The method of claim 9, wherein the file set types include at least one of include sets, delete sets, and work group sets.

14. The method of claim 9, wherein control data and the file may be disregarded by a user during a restore operation if the file is identified by the user as being unnecessary.

15. A method of customizing the creation of an image on computer readable medium, utilizing executable instructions stored on a computer readable medium, the method comprising:

identifying zero or more exclude files in an image source as files not to include in a created image target; and identifying one or more include files in an image source which are included in the image target.

16. The method of claim 15, further comprising:

identifying a first partition type of the image source and permitting a second partition type different from the first partition type to exist on the image target.

17. The method of claim 15, further comprising:

receiving one or more set types associated with one or more of the include files.

18. The method of claim 17, further comprising:

creating one or more customized image targets based on one or more of the set types from the image target.

19. The method of claim 18, wherein one or more of the customized targets are created on one or more computer readable media used by one or more computing devices.

* * * * *